Aug. 26, 1969

E. W. TURPIN 3,463,208

WHEEL CENTERING TOOL

Filed Sept. 20, 1966

EUGENE W. TURPIN
INVENTOR

Huebner & Worrel
ATTORNEYS

Aug. 26, 1969                    E. W. TURPIN                    3,463,208
                              WHEEL CENTERING TOOL
Filed Sept. 20, 1966                                        2 Sheets-Sheet 2

EUGENE W. TURPIN
INVENTOR

Huebner & Worrel
ATTORNEYS

United States Patent Office 3,463,208
Patented Aug. 26, 1969

3,463,208
WHEEL CENTERING TOOL
Eugene W. Turpin, 66 N. Academy,
Sanger, Calif. 93657
Filed Sept. 20, 1966, Ser. No. 580,826
Int. Cl. B23q 3/12; B25h 5/00
U.S. Cl. 144—288          10 Claims

ABSTRACT OF THE DISCLOSURE

A wheel positioning mechanism for a tire removing apparatus which includes a rotatable spindle receiving and supporting a centering plate, the plate in turn rotatably supporting a coplanar annular frame for relative movement thereto, cammable members pivoted intermediate their ends to the centering plate and disposed 120 degrees apart, camming means on the annular frame engageable with the members for camming thereof incident to relative rotational movement between the frame and plate, and guide elements carried by the members engageable with the periphery of a central opening in a wheel received and supported on the annular frame for centering the wheel with respect to the spindle.

---

The present invention relates to a wheel centering tool and more particularly to such a tool which is adapted to center wheels having center holes of different diameters with respect to a mounting spindle for work on said wheels or tires borne thereby. The device of the present invention is intended and described herein for use on a tire dismounting apparatus of the type shown and described in my U.S. Patent No. 3,168,130 entitled Wheel Supporting and Tire Dismounting Apparatus, and my U.S. Patent No. 3,267,977 entitled Support Device for Vehicle Wheels. However, it will be apparent that the structure of the present invention is not limited to such environment or association.

The device of above-mentioned Patent No. 3,267,977 is specifically intended to provide a positionably adjustable mounting assembly so that wheels of varied rim and hub configurations can be mounted most advantageously with respect to the tire removing apparatus of also above-mentioned Patent No. 3,168,130. In this respect, the structure is completely successful.

However, it is difficult if not virtually impossible precisely to center wheels having central openings which are of a substantially greater diameter than the spindle by visual observation. Obviously, if the wheel is not centered precisely about the spindle when it is rotated for removal of the tire or for any other purpose, optimum operation of the device will not be achieved.

Accordingly, it is an object of the present invention to provide a wheel centering tool which is adapted for use on the improved support device of my prior patent.

Another object is to provide such a wheel centering tool which is operable precisely to center a wheel with respect to a spindle therefor.

Another object is to provide such a wheel centering tool which is automatically operable upon rotation of such a spindle.

Another object is to provide such a wheel centering tool which can center wheels having central openings of a variety of diameters.

Another object is to provide such a centering tool which can be quickly and easily installed for use.

Another object is to provide such a wheel centering tool which is sturdy enough to support even the heaviest of wheels for the removal of tires therefrom.

A further object is to provide such a wheel centering tool which is of the simplest and most inexpensive construction concomitant with its efficient operation.

Still further objects of the present invention are to provide improved elements and arrangements thereof in an apparatus for the purposes set forth, which is fully effective in achieving its intended purposes.

These, together with other objects and advantages of the present invention, will become more fully apparent upon reference to the following description and accompanying drawings.

Figure 1:
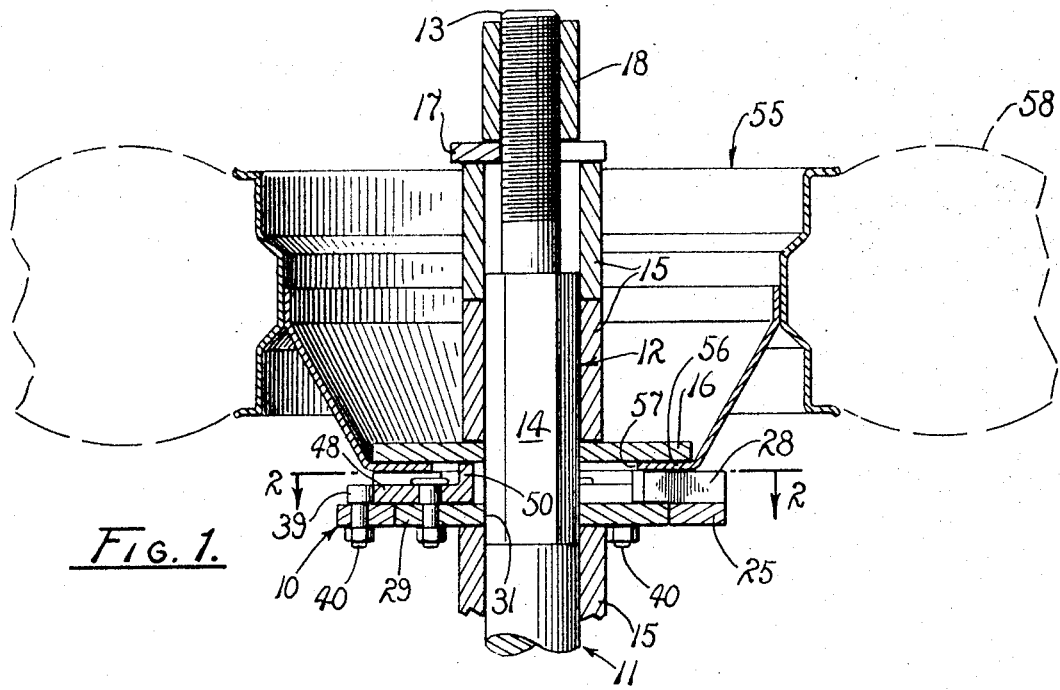
FIG. 1 is a fragmentary side elevation of the wheel centering tool of the present invention in operable assembly with a wheel mounted thereon and a tire fragmentarily illustrated in dashed lines thereabout.

Referring in greater particularity to the drawings, a wheel centering tool embodying the principles of the present invention is generally indicated by the numeral 10. As previously discussed, the wheel centering tool is useable in combination with the support device of my Patent No. 3,267,977 which is generally indicated by the numeral 11. The support device includes a vertical wheel mounting index or spindle 12 having an upper threaded end 13. However, unlike the spindle of my previous patent, this spindle has an intermediate wheel mounting portion 14 which is hexagonal in cross section. A number of tubular sleeves 15 of varying lengths are removably received in "stacked" relation about the spindle. A compression washer 16 is removably mounted about the spindle between selected tubular sleeves. A U-shaped force transmitting ring 17 is removably positioned about the spindle and rested on the uppermost tubular sleeve. A lock nut 18 is threadably secured about the threaded upper end of the spindle.

The wheel centering tool 10 of the present invention is removably received about the wheel mounting portion 14 of the spindle 12 below the compression washer 16 and rested on a tubular sleeve 15, as shown best in FIG. 1. The centering tool has a circular outer frame 25 having an upper surface 26 and a centrally located circular opening 27. Three lock bars 28 are mounted 120 degrees apart on the upper surface of the outer frame and extend radially a short distance toward the axis of the circular outer frame across the circular opening.

A circular orientation means or centering plate 29 having a diameter slightly smaller than that of the circular opening 27 of the outer frame 25, is rotatably positioned in the circular opening against the lock bars 28. The centering plate has an upper surface 30 and a centrally located hexagonal mounting bore 31 of a slightly larger size than the hexagonal wheel mounting portion 14 of the mounting spindle 12. The wheel centering tool is mounted as previously described with the wheel mounting portion of the mounting spindle extending through the mounting bore in driving relation thereto.

Figure 2:
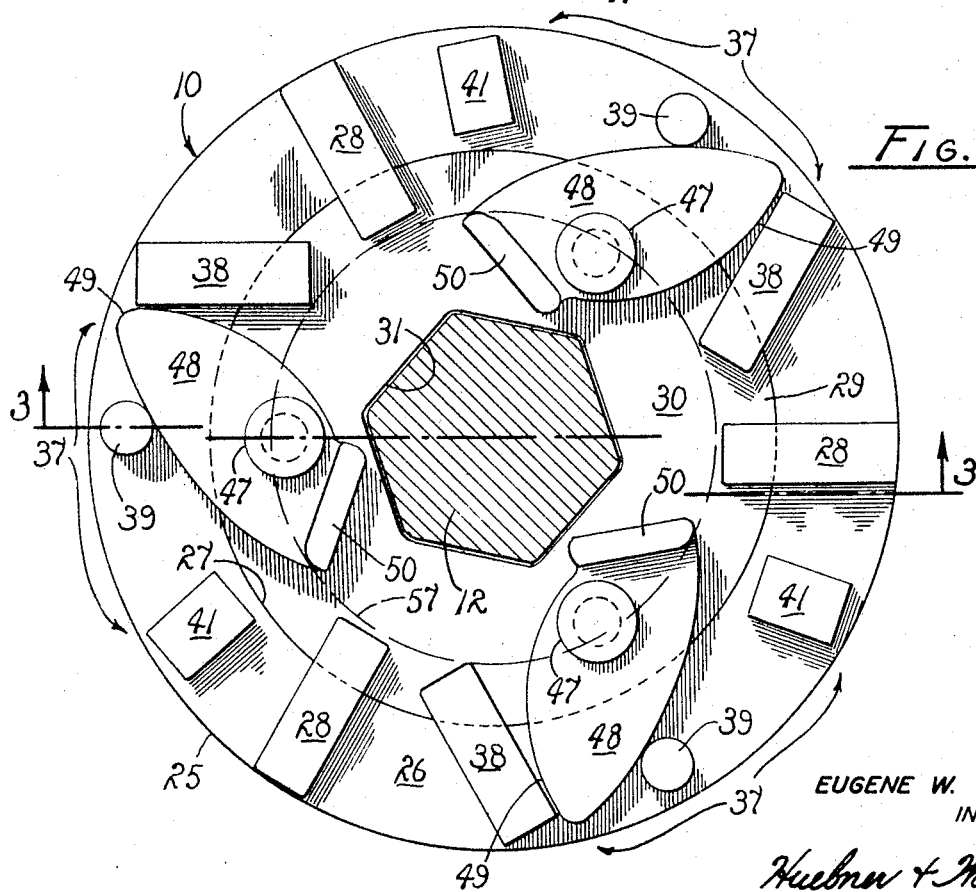
FIG. 2 is a somewhat enlarged top view of the wheel centering tool taken on line 2—2 of FIG. 1.
Figure 3:
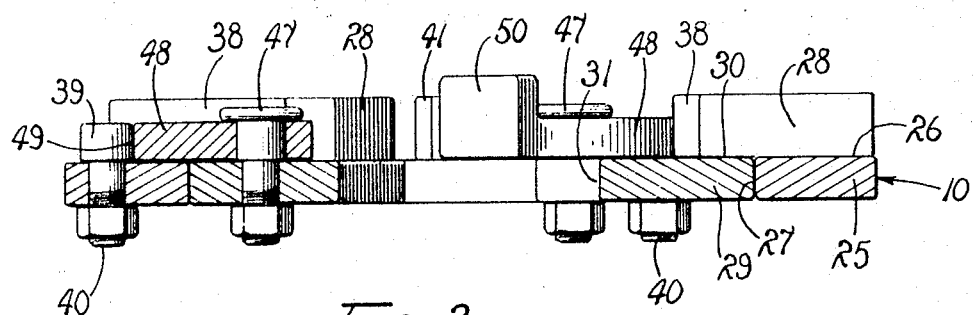
FIG. 3 is a transverse vertical section of the wheel centering tool taken on line 3—3 of FIG. 2.

Three substantially identical centering mechanisms 37 are individually mounted on the upper surfaces 26 and 30 of the outer frame 25 and centering plate 29 respectively, between adjacent lock bars 28. Each of the centering mechanisms has a cam bar 38 which is mounted on the upper surface of the outer frame and is disposed in angular relation with respect to its adjacent lock bar, as best shown in FIG. 2. A cam pin 39 is provided by each of the centering mechanisms a predetermined distance from the cam bar of the centering mechanism approximately midway between its adjacent lock bars and adjacent to the periphery of the outer frame. Each cam pin is mounted on the outer frame by means of an integral pin assembly 40. Each of the centering mechanisms also provides a stop 41 which is mounted in a position adjacent to the lock bar on the opposite side of the cam pin from the cam bar of that centering mechanism.

Each of the centering mechanisms 37 further provides a rotation assembly 47 which is mounted on the upper surface 30 of the centering plate 29. The rotation assemblies are disposed approximately 120 degrees apart circumferentially about the axis of the centering plate. Three levers or guide members 48 are individually, rotatably mounted on the rotation assemblies and extend in resting relation across the upper surfaces 26 and 30 of the outer frame 25 and centering plate respectively. The centering plate is rotatably held in the circular opening 27 of the outer frame below the lock bars 28 by the guide members resting on the upper surfaces of the outer frame and centering plate. Each of the guide members has an outer contoured portion 49 which normally extends between the cam bar 38 and cam pin 39 of its respective centering mechanism, as best shown in FIG. 2. A guide 50 is integrally provided on the end of each of the guide members closest to the mounting bore 31 of the centering plate. Each of the guides extends a relatively short distance above the guide members and the lock bars 28 parallel to the mounting spindle 12.

OPERATION

The operation of the described embodiment of the subject invention is believed readily apparent and is briefly described at this point. Before use, the lock nut 18, force transmitting ring 17, tubular sleeves 15, and compression washer 16 are removed from the mounting spindle 12 of the support device 11, thus leaving the wheel centering tool 10 as the upwardmost element on the spindle. The centering tool is then arranged, as shown in full lines in FIG. 4, with the guides 50 in their closest position to the mounting bore 31.

Subsequently, a wheel 55, having a hub 56 with a relatively large center hole 57 and a tire 58 mounted thereon is slidably received on the support device 11 with the mounting spindle 12 and guides 50 extending through the center hole of the wheel. The hub of the wheel is rested on the lock bars 28, cam bars 38 and stops 41. Since the guides extend above the lock bars, cam bars and stops they can extend into the center hole of the wheel. As long as the mounting spindle and guides are extended through the center hole, the wheel need not otherwise be centered since operation of the support device will automatically perform this function.

Figure 4:
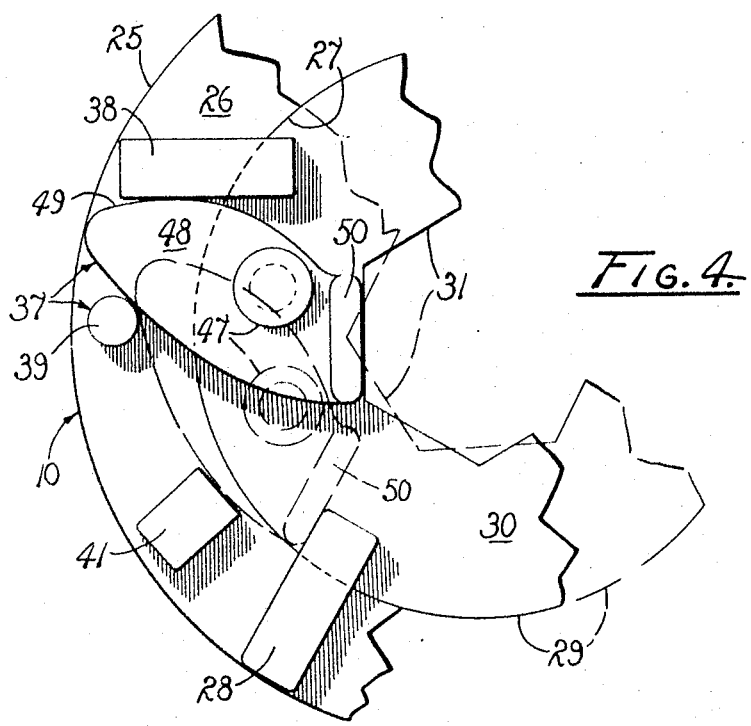
FIG. 4 is a fragmentary diagrammatic view of the wheel centering tool of the present invention showing two operational adjustments thereof.

Upon actuation of the support device 11, as fully described in my Patent No. 3,267,977 the mounting spindle 12 is rotated a short distance in a counterclockwise direction as viewed in FIG. 2. This, of course, causes the centering plate 29 to be rotated in the same direction. During this time the wheel 55 is held against rotation by the operator. This imposes a substantial drag against the outer frame 25 by virtue of the interpositioned lock bars 28, cam bars 38 and particularly the stops 41 which do not overlap the centering plate 29. Such retardation of the outer frame is sufficient to permit limited rotation of the centering plate relative to the outer frame for actuating the guide members 48. Since the guide members 48 are rotatably mounted on the rotation assemblies 47 of the centering plate, the guide members are, of course, moved with the centering plate. The directing action of the cam bar 38 and cam pin 39 of each centering mechanism 37 on the contoured portion 49 of their respective guide member causes its guide 50 to be moved outwardly from the mounting spindle as is best indicated in FIG. 4.

The guides thus are moved uniformly away from the mounting spindle until all three of them contact the hub 56 within the center hole 57 of the wheel. This causes the wheel to be centered circumferentially about the mounting spindle since, if one side of the hub is closer to the mounting spindle than the others, it is forced by its guide away from the spindle until the other sides are contacted by their guides. Thus, with the wheel centered, the centering tool 10 is arranged substantially as shown in FIG. 2.

Obviously, the mounting spindle 12 need only be rotated a short distance to center the wheel 55. Thus, the support device 11 need only be actuated for a moment. If the mounting spindle continues to turn after the guides 50 have all contacted the hub 56 within the center hole 57, the entire centering tool 10 and wheel are merely caused to rotate about the mounting spindle 12. FIG. 4 shows the limits of movement of a typical guide member 48 in full lines and dashed lines. The guide members are prevented from moving completely out of the area of influence of their cam bars 38 and cam pins 39 by stops 41.

After centering of the wheel 55, the compression washer 16, tubular sleeves 15, force transmitting ring 17 and lock nut 18 are repositioned about the mounting spindle 12 above the wheel and are tightened into place as shown in FIG. 1. It should be noted that the guides 50 are just long enough to extend into the center hole 57 of the wheel without reaching above it. Thus, the wheel can be tightened into place by the direct pressure of the compression washer against the hub 56 above the center hole. Subsequently, the devices of my above-mentioned patents are employed to remove the tire 58 from the wheel, as described therein, or the wheel and/or tire otherwise worked upon.

The device of the present invention provides a quick, simple and efficient means of centering a wheel with respect to a shaft or spindle. Furthermore, it is relatively inexpensive while being completely successful in achieving its intended purposes.

Although the invention has been herein shown and described in what is conceived to be the most practical and preferred embodiment, it is recognized that departures may be made therefrom within the scope of the invention, which is not to be limited to the details disclosed herein.

Having described my invention, what I claim as new and desire to secure by Letters Patent is:

1. A positioning mechanism adapted to receive an object and to locate the object in predetermined relation to an index, comprising a movable support means including said index, a frame mounted on said support means and movable relative thereto, said frame being adapted to receive and support such an object, and orientation means pivotally mounted on the support means and engageable with the object to position the object in predetermined relation with respect to the index incident to relative movement of the frame and the orientation means.

2. The positioning mechanism of claim 1 wherein the index and the orientation means are operably connected for corresponding rotational movement and the object is adjusted radially with respect to the axis of such rotation.

3. The positioning mechanism of claim 2 wherein the object is gravitationally rested on the frame.

4. A wheel centering tool comprising a rotatable spindle; a centering plate received on said spindle for rotation therewith; a frame rotatably mounted on said centering plate adapted to support a wheel; and positioning means provided on the centering plate for centering said wheel with respect to the spindle upon rotation of the centering plate in a predetermined direction with respect to the frame.

5. The wheel centering tool of claim 4 wherein the positioning means includes a plurality of guides which are correspondingly positionable upon rotation of the centering plate relative to the frame.

6. The wheel centering tool of claim 5 wherein the positioning means further includes camming surfaces engageable with means on the frame to control movement of said guides upon rotation of said centering plate.

7. The wheel centering tool of claim 6 wherein the wheel has a central opening which is positioned about the guides and rested on the frame for rotation therewith so that upon rotation of the spindle in a predetermined direction in relation to the wheel the guides are correspondingly moved by the camming surfaces outwardly from the spindle against the wheel within its central opening, thus centering it with respect to the spindle.

8. A wheel centering tool comprising a first member having a substantially circular periphery, a second member circumscribing the first member for relative rotational movement thereabout, a plurality of levers pivotally mounted in substantially equally spaced relation on one of said members for movement about substantially equally radially spaced axes substantially parallel to the axis of relative rotational movement of said members, means mounted on the other of said members operably associated with the levers to translate relative rotational movement of said members into corresponding pivotal movement of said levers, and wheel engaging means individual to the levers mounted on their respective levers in corresponding spaced relation to the pivot axes thereof.

9. The wheel centering tool of claim 8 in which the first member is adapted for mounting on a rotatable spindle for rotation therewith, the second member is adapted to have the wheel rested thereon for rotation therewith and relative radial sliding movement, the levers are mounted on the first member, said levers provide similar cam surfaces disposed adjacent to the second member, and means are mounted on the second member individual to the levers and engaged with the respective cam surfaces thereof to translate relative rotational movement of the members into corresponding pivotal movement of the levers.

10. The positioning mechanism of claim 1 wherein said support means comprises a rotatable spindle and a central plate carried by the spindle and rotatable therewith, said frame comprises an annular plate encompassing said central plate and generally coplanar therewith, and said orientation means comprises cammable members each having oppositely disposed ends and solely supported on a pivot disposed intermediate its ends.

References Cited

UNITED STATES PATENTS

| | | | |
|---|---|---|---|
| 2,178,101 | 10/1939 | Hatch | 144—288 |
| 1,751,023 | 3/1930 | Aune | 144—288 |
| 1,704,440 | 3/1929 | Little | 144—288 |
| 2,948,314 | 8/1960 | Bishman | 144—288 |
| 3,313,328 | 4/1967 | Clapp | 144—288 |
| 3,310,081 | 3/1967 | Cahill | 144—288 |

FOREIGN PATENTS 549,932  12/1942  Great Britain.

FRANK T. YOST, Primary Examiner